(12) United States Patent
Joehnck et al.

(10) Patent No.: US 7,951,885 B2
(45) Date of Patent: May 31, 2011

(54) HYDROPHILIC CROSSLINKED POLYMER

(75) Inventors: Matthias Joehnck, Darmstadt (DE); Eckhard Sabrowskii, Rosslau (DE)

(73) Assignee: Merck Patent GmbH, Darmstadt (DE)

( * ) Notice: Subject to any disclaimer, the term of this patent is extended or adjusted under 35 U.S.C. 154(b) by 624 days.

(21) Appl. No.: 11/997,613

(22) PCT Filed: Jun. 8, 2006

(86) PCT No.: PCT/EP2006/005484
§ 371 (c)(1), (2), (4) Date: Feb. 1, 2008

(87) PCT Pub. No.: WO2007/014591
PCT Pub. Date: Feb. 8, 2007

(65) Prior Publication Data
US 2008/0210615 A1    Sep. 4, 2008

(30) Foreign Application Priority Data

Aug. 3, 2005   (EP) ..................... 05016846
Jun. 2, 2006   (WO) ................. PCT/EP2006/005296

(51) Int. Cl.
*C08F 12/28* (2006.01)
(52) U.S. Cl. ........................ 526/310; 526/312
(58) Field of Classification Search ............. 526/310, 526/312
See application file for complete search history.

(56) References Cited

U.S. PATENT DOCUMENTS

| | | | |
|---|---|---|---|
| 4,767,620 A | 8/1988 | Mauz et al. | |
| 4,931,476 A | 6/1990 | Mauz et al. | |
| 5,294,491 A | 3/1994 | Goeldner et al. | |
| 5,453,186 A | 9/1995 | Muller et al. | |
| 5,576,407 A * | 11/1996 | Kroner et al. | 526/332 |
| 5,599,702 A | 2/1997 | Sauber | |
| 6,492,471 B1 | 12/2002 | Komiya et al. | |

FOREIGN PATENT DOCUMENTS

| | | |
|---|---|---|
| DE | 33 44 912 A1 | 6/1985 |
| DE | 3344912 A1 | 6/1985 |
| DE | 37 14 276 A1 | 11/1988 |
| DE | 3714276 A1 | 11/1988 |
| DE | 3714276 W | 11/1988 |
| EP | 0006199 A1 | 1/1980 |
| EP | 0006199 B1 | 2/1982 |
| EP | 0266503 A1 | 5/1988 |
| EP | 0337144 A | 10/1989 |
| EP | 0337144 A1 | 10/1989 |
| EP | 0337144 W | 10/1989 |
| EP | 0482339 A1 | 4/1992 |
| EP | 0482339 W | 4/1992 |
| EP | 1177243 A1 | 2/2002 |
| EP | 1179732 A2 | 2/2002 |
| EP | 1779732 A2 | 2/2002 |
| EP | 1693108 A1 | 8/2006 |
| IE | 58209 B | 8/1993 |
| WO | 9513861 A1 | 5/1995 |
| WO | WO 95/13861 A1 | 5/1995 |
| WO | 9609116 A1 | 3/1996 |
| WO | WO 96/09116 A1 | 3/1996 |
| WO | 9729825 A1 | 8/1997 |
| WO | WO 97/29825 A1 | 8/1997 |
| WO | 0068300 A1 | 11/2000 |
| WO | 0069872 A2 | 11/2000 |
| WO | WO 00/69872 A2 | 11/2000 |
| WO | 0138228 A1 | 5/2001 |
| WO | WO 01/38228 A1 | 5/2001 |
| WO | 03104294 A1 | 12/2003 |
| WO | WO 03/104294 A1 | 12/2003 |
| WO | WO 2006/058623 A1 | 6/2006 |

OTHER PUBLICATIONS

Y. Tezuka et al., Macromol. Chem., 186, 685-694 (1985).
L.W. McLaughlin, Chem. Rev., 89, 309-319 (1989).
"Preparative Chromatography" (Ed. H. Schmidt-Traub, Wiley-VCH Verlag Weinheim, 2005, ISBN 3-527-30643-9) (183-189; 190-204).
EP04028798.9; Priority Document of WO2006/058623.
McLaughlin, L.W. "Mixed-Mode Chromatography of Nucleic Acids." (Chem. Rev.), 1989, 309-319, 89.
Schmidt-Traub, H. "Preparative Chromatography of Fine Chemicals and Pharmaceutical Agents." Wiley-VCH Verlag Weinheim, 2005, 183-189 and 190-204.
Tezuka, et al. "Synthesis of poly(vinyl alcohol)/poly(dimethylsiloxane) graft copolymer."(Makromol. Chem.), 1985, 685-694, 186.

* cited by examiner

*Primary Examiner* — Edward J Cain
(74) *Attorney, Agent, or Firm* — Millen, White, Zelano & Branigan, P.C.

(57) ABSTRACT

The present invention relates to a hydrophilic crosslinked polymer, preferably in the form of porous particles, and to the preparation and use thereof. The polymer according to the invention is produced by polymerisation from chain-forming hydrophilic vinyl ethers and crosslinking, preferably heterocyclic divinyl ethers.

30 Claims, 5 Drawing Sheets

HYDROPHILIC CROSSLINKED POLYMER

This application claims the benefit of the filing date of International Application No.: PCT/EP2006/005296 filed Jun. 2, 2006 and is incorporated by reference herein.

The present invention relates to a hydrophilic crosslinked polymer, preferably in the form of porous particles, and to the preparation and use thereof. The polymer according to the invention is produced by polymerisation from chain-forming hydrophilic vinyl ethers and crosslinking N,N'-divinyl compounds, preferably heterocyclic N,N'-divinyl compounds.

Hydrophilic, crosslinked, polymeric support materials are frequently employed in areas such as chromatography, solid-phase synthesis or catalysis. In particular for use as support material in chromatography, polymers of this type should have the following properties:
  the materials should be sufficiently hydrophilic that, in particular, use in biochromatography is possible
  it should be possible for the materials to be modified, if required, by means of separation effectors in order that their separation properties can be matched to the particular separation problem
  the polymer must be sufficiently stable to hydrolysis
  in particular for applications in the area of high-pressure liquid chromatography, the material must have adequate pressure/flow stability
  the materials should have adequate pore sizes
In addition, it should be possible to prepare polymers of this type in as simple and reproducible a manner as possible.

WO 03/104294 discloses polyvinyl ethers, in particular for use in solid-phase synthesis. The polymers disclosed usually exhibit very strong swelling behaviour.

DE 37 14 276 and DE 3344912 disclose crosslinked polymers based on vinyl acetates. In order to produce a hydrophilic polymer, the acetate groups have to be saponified subsequently.

WO 9513861 discloses polyvinyl ethers for separation purposes which are prepared by cationic polymerisation. The cationic polymerisation described must be carried out in combination with complex protecting-group chemistry.

EP 0 266 503 discloses crosslinked polymers which are prepared by means of suspension polymerisation from monomers containing epoxide groups. The resultant polymers containing epoxide groups can then be used for the immobilisation of biologically active substances.

EP 0 482 339 discloses a copolymer based on allyl monomers. In particular, the copolymer based on EP 0 482 339 comprising 1,2,-dihydroxy-3-allyloxypropane and N,N'-methylenebisacrylamide, commercially available under the name FractoPrep® (Merck KGaA, Germany), exhibits good properties for biochromatography with respect to hydrophilicity, stability to hydrolysis and pressure/flow stability. However, the disadvantage of this material is the complex preparation process by means of inverse suspension polymerisation.

The object of the present invention was therefore to provide a hydrophilic polymeric support material which meets the above-mentioned requirements with respect to porosity, hydrophilicity, stability to hydrolysis and pressure/flow stability and in addition is simple to prepare.

It has been found that copolymerisation of hydrophilically substituted alkyl vinyl ethers using crosslinking, preferably heterocyclic N,N'-divinyl compounds enables the preparation of hydrophilic polymers having good properties, in particular for biochromatography. The polymers are preferably prepared by means of suspension polymerisation.

The present invention therefore relates to a hydrophilic crosslinked polymer based on a copolymer at least comprising
a) at least one hydrophilically substituted alkyl vinyl ether of the formula I

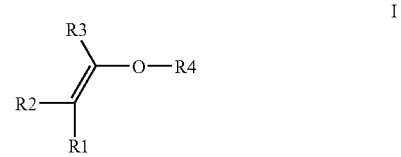

where R1, R2, R3, independently of one another, can be H or C1 to C6 alkyl, preferably H or —CH$_3$,
and R4 is a radical which carries at least one hydroxyl group
and
b) at least one crosslinking agent conforming to formula II and/or III and/or IV with

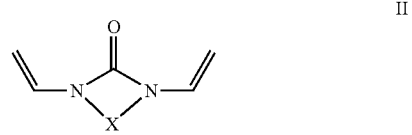

where X is a divalent alkyl radical having 2 to 5 C atoms, preferably 2 or 3 C atoms, in which one or more methylene groups which are not adjacent and are not located in the direct vicinity of N may be replaced by O, C=O, S, S=O, SO$_2$, NH, NOH or N and one or more H atoms of the methylene groups may be substituted, independently of one another, by hydroxyl groups, C1-C6-alkyl, halogen, NH$_2$, C5-C10-aryl, NH—(C1-C8)-alkyl, N—(C1-C8)-alkyl$_2$, C1-C6-alkoxy or C1-C6-alkyl-OH, and

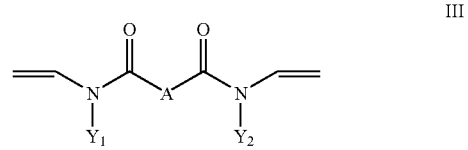

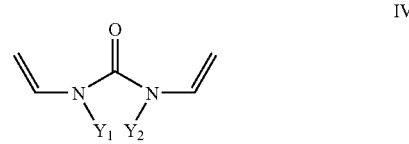

where Y1 and Y2 in formula III and IV are, independently of one another,
C1 to C10 alkyl or cycloalkyl, where one or more non-adjacent methylene groups or methylene groups which are not located in the direct vicinity of N may be replaced by O, C=O, S, S=O, SO$_2$, NH, NOH or N and one or more H of the methylene groups may be substituted, independently of one another, by hydroxyl groups, C1-C6-alkyl, halogen, NH$_2$, C5-C10-aryl, NH(C1-C8)alkyl, N(C1-C8)alkyl$_2$, C1-C6-alkoxy or C1-C6-alkyl-OH,
or C6 to C18 aryl, where one or more H in the aryl system may be substituted, independently of one another, by hydroxyl groups, C1-C6-alkyl, halogen, $NH_2$, $NH(C1-C8)$alkyl, $N(C1-C8)$alkyl$_2$, C1-C6-alkoxy or C1-C6-alkyl-OH and A is a divalent alkyl radical having 2 to 5 C atoms, preferably 2 or 3 C atoms, in which one or more non-adjacent methylene groups or methylene groups which are not located in the direct vicinity of N may be replaced by O, C=O, S, S=O, $SO_2$, NH, NOH or N and one or more H of the methylene groups may be substituted, independently of one another, by hydroxyl groups, C1-C6-alkyl, halogen, $NH_2$, C5-C10-aryl, $NH(C1-C8)$alkyl, $N(C1-C8)$alkyl$_2$, C1-C6-alkoxy or C1-C6-alkyl-OH.

R4 in formula I is typically an alkyl radical, a cycloaliphatic radical or an aryl radical which carries at least one hydroxyl group.

In a preferred embodiment, R4 in formula I is a straight-chain or branched C1 to C10 alkyl radical, in which one or more non-adjacent methylene groups may be replaced by O, C=O, S, S=O, $SO_2$, NH, NOH, N and/or in which one or more H atoms may be substituted, independently of one another, by C1-C6-alkyl, C5-C10-aryl, halogen, $NH_2$, $NH(C1-C8)$alkyl, $N(C1-C8)$alkyl$_2$, C1-C6-alkoxy or C1-C6-alkyl-OH and in which at least one OH group is present either on the C1 to C10 alkyl radical or on a substituent, or a cycloaliphatic radical, typically having 5 to 10 C atoms, in which one or more non-adjacent methylene groups may be replaced by O, C=O, S, S=O, $SO_2$, NH, NOH, N and/or in which one or more H atoms of the cycloaliphatic radical may be substituted, independently of one another, by C1-C6-alkyl, C5-C10-aryl, halogen, $NH_2$, $NH(C1-C8)$alkyl, $N(C1-C8)$alkyl$_2$, C1-C6-alkoxy or C1-C6-alkyl-OH, where at least one OH group is present either on the cycloaliphatic ring or on a side chain or substituent, or a C6 to C18 aryl radical, where one or more H atoms in the aryl radical may be substituted, independently of one another, by hydroxyl groups, C1-C6-alkyl, C5-C10-aryl, halogen, $NH_2$, $NH(C1-C8)$alkyl, $N(C1-C8)$alkyl$_2$, C1-C6-alkoxy or C1-C6-alkyl-OH, where at least one OH group is present either on the aryl radical or on a side chain or substituent, or a C5 to C18 heteroaryl radical, where one or more H atoms in the heteroaryl radical may be substituted, independently of one another, by hydroxyl groups, C1-C6-alkyl, C5-C10-aryl, halogen, $NH_2$, $NH(C1-C8)$alkyl, $N(C1-C8)$alkyl$_2$, C1-C6-alkoxy or C1-C6-alkyl-OH, where at least one OH group is present either on the heteroaryl radical or on a side chain or substituent.

In a particularly preferred embodiment, R4 in formula I is a straight-chain or branched C1 to C10 alkyl radical, in which one or more non-adjacent methylene groups may be replaced by O, S, $SO_2$ or NH and/or in which one or more H atoms may be substituted, independently of one another, by C1-C6-alkyl, C5-C10-aryl, C1-C6-alkoxy or C1-C6-alkyl-OH and in which at least one OH group is present either on the C1 to C10 alkyl radical or on a substituent, or a cycloaliphatic radical, typically having 5 to 10 C atoms, in which one or more non-adjacent methylene groups may be replaced by O, S, $SO_2$ or NH and/or in which one or more H atoms of the cycloaliphatic radical may be substituted, independently of one another, by C1-C6-alkyl, C5-C10-aryl, C1-C6-alkoxy or C1-C6-alkyl-OH, where at least one OH group is present either on the cycloaliphatic ring or on a side chain or substituent, or a C6 to C14 aryl radical, where one or more H atoms in the aryl radical may be substituted, independently of one another, by hydroxyl groups, C1-C6-alkyl, C5-C10-aryl, C1-C6-alkoxy or C1-C6-alkyl-OH, where at least one OH group is present either on the aryl radical or on a side chain or substituent, or a C6 to C14 heteroaryl radical, in which at least one N atom is present as heteroatom and where one or more H atoms in the heteroaryl radical may be substituted, independently of one another, by hydroxyl groups, C1-C6-alkyl, C5-C10-aryl, C1-C6-alkoxy or C1-C6-alkyl-OH, where at least one OH group is present either on the heteroaryl radical or on a side chain or substituent.

In a preferred embodiment, the hydrophilically substituted alkyl vinyl ether employed is a compound of the formula I in which R4 is a radical which carries a hydroxyl group.

In a particularly preferred embodiment, the hydrophilically substituted alkyl vinyl ether employed is 1,2-ethanediol monovinyl ether, 1,3-propanediol monovinyl ether, 1,4-butanediol monovinyl ether, 1,5-pentanediol monovinyl ether, 1,6-hexanediol monovinyl ether or diethylene glycol monovinyl ether and the cycloaliphatic vinyl ether employed is cyclohexanedimethanol monovinyl ether.

In a further preferred embodiment, the crosslinking agent employed is divinylethyleneurea (1,3-divinylimidazolin-2-one) or divinylpropyleneurea (1,3-divinyltetrahydropyrimidin-2-one).

In another preferred embodiment, the polymer is porous having pore sizes between 2 and 200 nm.

In another embodiment, the polymer is in the form of particles having a diameter between 3 and 300 μm.

In another embodiment, the polymer has been derivatised by means of separation effectors.

In a preferred embodiment, the polymer has been derivatised by means of structures which have been attached to the polymer by graft polymerisation.

In a preferred embodiment, the polymer has been derivatised by means of structures which have been attached to the polymer by graft polymerisation with cerium(IV) catalysis.

In a particularly preferred embodiment, the structures are copolymers which have been produced from two or more different monomers.

The present invention also relates to a process for the preparation of polymers, characterised in that at least one hydrophilically substituted alkyl vinyl ether of the formula I and at least one crosslinking agent conforming to formula II and/or III and/or IV are copolymerised, with

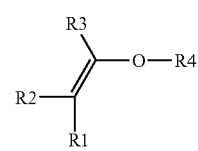

I where R1, R2, R3, independently of one another, can be H or C1 to C6 alkyl, preferably H or —$CH_3$, and R4 is a radical which carries at least one hydroxyl group and

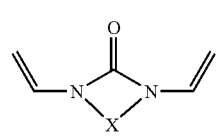

II where X is a divalent alkyl radical having 2 to 5 C atoms, preferably 2 or 3 C atoms, in which one or more methylene groups which are not adjacent and are not located in the direct vicinity of N may be replaced by O, C=O, S, S=O, $SO_2$, NH, NOH or N and one or more H atoms of the methylene groups may be substituted, independently of one another, by hydroxyl groups, C1-C6-alkyl, halogen, $NH_2$, C5-C10-aryl, NH—C1-C8-alkyl, N—C1-C8-alkyl$_2$, C1-C6-alkoxy or C1-C6-alkyl-OH, and

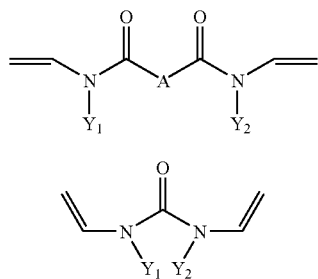

where Y1 and Y2 in formula III and IV are, independently of one another,

C1 to C10 alkyl or cycloalkyl, where one or more non-adjacent methylene groups or methylene groups which are not located in the direct vicinity of N may be replaced by O, C=O, S, S=O, $SO_2$, NH, NOH or N and one or more H of the methylene groups may be substituted, independently of one another, by hydroxyl groups, C1-C6-alkyl, halogen, $NH_2$, C5-C10-aryl, NH(C1-C8)alkyl, N(C1-C8)alkyl$_2$, C1-C6-alkoxy or C1-C6-alkyl-OH, or C6 to C18 aryl, where one or more H in the aryl system may be substituted, independently of one another, by hydroxyl groups, C1-C6-alkyl, halogen, $NH_2$, NH(C1-C8)alkyl, N(C1-C8)alkyl$_2$, C1-C6-alkoxy or C1-C6-alkyl-OH and A is a divalent alkyl radical having 2 to 5 C atoms, preferably 2 or 3 C atoms, in which one or more non-adjacent methylene groups or methylene groups which are not located in the direct vicinity of N may be replaced by O, C=O, S, S=O, $SO_2$, NH, NOH or N and one or more H of the methylene groups may be substituted, independently of one another, by hydroxyl groups, C1-C6-alkyl, halogen, $NH_2$, C5-C10-aryl, NH(C1-C8)alkyl, N(C1-C8)alkyl$_2$, C1-C6-alkoxy or C1-C6-alkyl-OH.

In a preferred embodiment, R4 in formula I is
a straight-chain or branched C1 to C10 alkyl radical, in which one or more non-adjacent methylene groups may be replaced by O, C=O, S, S=O, $SO_2$, NH, NOH, N and/or in which one or more H atoms may be substituted, independently of one another, by C1-C6-alkyl, C5-C10-aryl, halogen, $NH_2$, NH(C1-C8)alkyl, N(C1-C8)alkyl$_2$, C1-C6-alkoxy or C1-C6-alkyl-OH and in which at least one OH group is present either on the C1 to C10 alkyl radical or on a substituent, or a cycloaliphatic radical, typically having 5 to 10 C atoms, in which one or more non-adjacent methylene groups may be replaced by O, C=O, S, S=O, $SO_2$, NH, NOH, N and/or in which one or more H atoms of the cycloaliphatic radical may be substituted, independently of one another, by C1-C6-alkyl, C5-C10-aryl, halogen, $NH_2$, NH(C1-C8)alkyl, N(C1-C8)alkyl$_2$, C1-C6-alkoxy or C1-C6-alkyl-OH, where at least one OH group is present either on the cycloaliphatic ring or on a side chain or substituent, or a C6 to C18 aryl radical, where one or more H atoms in the aryl radical may be substituted, independently of one another, by hydroxyl groups, C1-C6-alkyl, C5-C10-aryl, halogen, $NH_2$, NH(C1-C8)alkyl, N(C1-C8)alkyl$_2$, C1-C6-alkoxy or C1-C6-alkyl-OH, where at least one OH group is present either on the aryl radical or on a side chain or substituent, or a C5 to C18 heteroaryl radical, where one or more H atoms in the heteroaryl radical may be substituted, independently of one another, by hydroxyl groups, C1-C6-alkyl, C5-C10-aryl, halogen, $NH_2$, NH(C1-C8)alkyl, N(C1-C8)alkyl$_2$, C1-C6-alkoxy or C1-C6-alkyl-OH, where at least one OH group is present either on the heteroaryl radical or on a side chain or substituent.

In a preferred embodiment, a free-radical suspension polymerisation is carried out.

In a particularly preferred embodiment, a free-radical suspension polymerisation is carried out in water as suspension medium in the presence of at least one suspension stabiliser and optional further additives, preferably inorganic salts and interface-active compounds.

In an embodiment, the temperature during the polymerisation is between 40 and 100° C.

In a preferred embodiment, hydrophilically substituted alkyl vinyl ethers and crosslinking agents are employed in a weight ratio between 10:90 and 80:20.

In a preferred embodiment, the polymerisation is carried out with addition of one or more porogens.

The present invention also relates to a chromatography column, capillary, cartridge, stirred reactor or reactor containing a polymer according to the invention as sorbent or support material.

The present invention also relates to the use of a hydrophilic crosslinked polymer according to the invention as sorbent in chromatography, as support material for the immobilisation of biologically or catalytically active substances or as support material for a solid-phase synthesis.

The present invention also relates to polymers obtainable by the process according to the invention.

Further combinations and preferred embodiments are disclosed in the patent claims.

Figure 1:
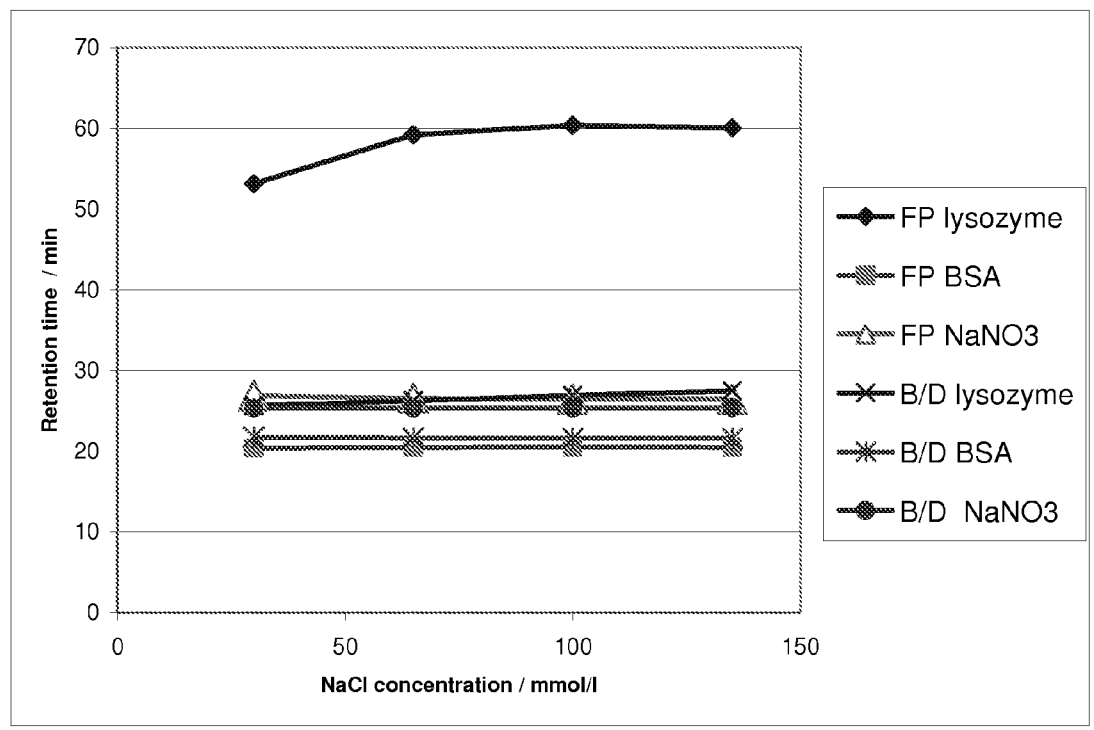
FIG. 1 shows the retention behaviour of the polymer according to the invention on application of proteins. Further details are given in Example 2.

In accordance with the invention, the term "cycloaliphatic radical" denotes a saturated hydrocarbon radical in which all or at least some of the hydrocarbon units are a constituent of a cyclic structure.

In accordance with the invention, N(C1-C8)alkyl$_2$ denotes a nitrogen which is substituted by at least two alkyl radicals. The two alkyl radicals here may have, independently of one another, 1 to 8 C atoms in straight-chain or branched form.

In accordance with the invention, a heteroaryl radical is an at least partially aromatic radical which differs from an aryl radical in that one or more non-adjacent C atoms have been replaced by N, S or O. It is clear to the person skilled in the art that, owing to the valences, the heteroatoms may optionally be substituted by, for example, H, C1-C6-alkyl or C1-C6-alkyl-OH.

The polymer according to the invention is a hydrophilic, crosslinked polymer based on a copolymer at least comprising
a) at least one hydrophilically substituted alkyl vinyl ether of the formula I

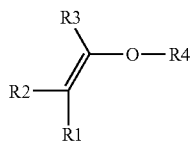

I where the radicals R1, R2, R3 and R4 have the above-mentioned meanings, and
b)
at least one crosslinking agent conforming to formula II and/or III and/or IV

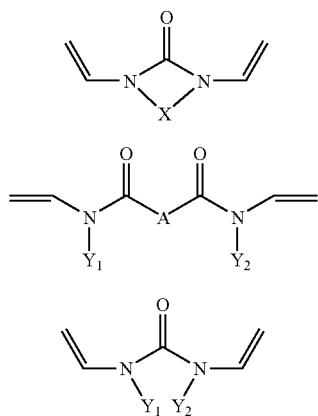

II

III

IV where the substituents X, A, Y1 and Y2 have the above-mentioned meanings.

This means the polymer is formed by copolymerisation of at least one compound from the group of the hydrophilically substituted alkyl vinyl ethers of the formula I and at least one compound from the group of the crosslinking agents of the formula II and/or III and/or IV. Preferably, only one compound from the group of the hydrophilically substituted alkyl vinyl ethers of the formula I and one compound from the group of the crosslinking agents of the formula II, III or IV is employed. However, it is also possible to employ one or more compounds from the group of the hydrophilically substituted alkyl vinyl ethers of the formula I and/or one or more compounds from the group of the crosslinking agents of the formula II and/or III and/or IV. Furthermore, further polymerisable compounds which are copolymerised into the polymer backbone can be added to the polymerisation mixture. These are typically compounds having at least one polymerisable double bond. Preferably, only one compound from the group of the hydrophilically substituted alkyl vinyl ethers of the formula I and one compound from the group of the crosslinking agents of the formula II, III or IV is employed.

In a preferred embodiment, the hydrophilically substituted alkyl vinyl ether employed is a compound of the formula I in which R4 is a radical which carries a hydroxyl group.

In a preferred embodiment, the hydrophilically substituted alkyl vinyl ether employed is 1,2-ethanediol monovinyl ether, 1,3-propanediol monovinyl ether, 1,4-butanediol monovinyl ether, 1,5-pentanediol monovinyl ether, 1,6-hexanediol monovinyl ether or diethylene glycol monovinyl ether and the cycloaliphatic vinyl ether employed is cyclohexanedimethanol monovinyl ether, particularly preferably 1,4-butanediol monovinyl ether, 1,5-pentanediol monovinyl ether, diethylene glycol monovinyl ether or cyclo-hexanedimethanol monovinyl ether.

The crosslinking agents employed are preferably compounds of the formula II. Preference is given to the use of divinylpropyleneurea (1,3-divinyl-tetrahydropyrimidin-2-one) or particularly preferably divinylethyleneurea (1,3-divinylimidazolin-2-one).

The proportion of the hydrophilically substituted alkyl vinyl ethers with respect to the weight of the polymer is typically between 1% (by weight) and 90% (by weight) or a maximum proportion by weight of the alkyl vinyl ether which corresponds to a molar ratio of 2:1, based on a bifunctional crosslinking agent, if the alkyl vinyl ether does not homopolymerise. The proportion of the hydrophilically substituted alkyl vinyl ethers is preferably between 10 and 80% (% by weight), particularly preferably between 35 and 60%. Accordingly, the proportion of the crosslinking agent is between 10 and 99 (% by weight), preferably between 20 and 90%, particularly preferably between 40 and 65%.

The process-engineering design of the copolymerisation of unsaturated compounds is known to the person skilled in the art. To this end, a free-radical polymerisation is carried out. A suspension polymerisation initiated by free radicals, also known as bead polymerisation, is preferably carried out. Descriptions of the way in which a polymerisation of this type is carried out are given, for example, in EP 1179732 A2 (general description page 4, lines 18 to 26, and page 5, line 3, to page 6, line 9, and, in particular, Example 1) or in EP 0006199 B1 (general description page 3, line 19, to page 4, line 13, and, in particular, Example 1). Depending on the dissolution behaviour of the monomers, an oil-in-water suspension polymerisation (normal-phase polymerisation) is carried out in a particularly simple procedure in the case of water-insoluble or sparingly water-soluble monomers, which are also known as oil. In the case of water-soluble monomers, by contrast, the latter are dissolved in water and suspended and polymerised in a water-immiscible or only sparingly water-miscible organic solvent (inverse polymerisation).

It has been found that, in particular in the case of the use of divinylethyleneurea or divinylpropyleneurea in combination with the preferred hydrophilically substituted alkyl vinyl ethers, such as 1,4-butanediol monovinyl ether, 1,5-pentanediol monovinyl ether, diethylene glycol monovinyl ether or cyclohexanedimethanol monovinyl ether, a (normal-phase) suspension polymerisation can be carried out. This offers the advantage of a very simple preparation process for the polymers according to the invention since the hydrophilic polymer is obtained in a single reaction step without having to carry out the complex inverse suspension polymerisation. A further major advantage of the hydrophilically substituted alkyl vinyl ethers employed in accordance with the invention is that a subsequent hydrolysis step does not have to be carried out in order to produce a hydrophilic polymer. Instead, the use of the hydroxyl-containing vinyl ethers as starting materials results in the direct formation of a hydroxyl-containing polymer.

The suspension polymerisation is carried out in a known manner.

The suspension medium used in the normal-phase suspension polymerisation is typically water.

One or more stabilisers and/or one or more interface-active compounds can, as is known, be added to the suspension medium.

Stabilisers which can be employed are a multiplicity of water-soluble macromolecular compounds or also finely divided inorganic compounds.

Examples of macromolecular stabilisers are polyvinylpyrrolidone, polyacrylates, polycarboxylates, polyacrylamide, polyvinyl alcohol, hydroxyalkylcellulose, methylcellulose or polyethylene glycols. Preference is given to the use of polyvinyl alcohols.

Inorganic compounds which can be employed as stabilisers are, for example, calcium phosphate or magnesium hydroxide.

Salts, ionic liquids or buffer substances, such as, for example, $Na_2HPO_4$ and $NaH_2PO_4$, can furthermore be added to the aqueous phase.

Suitable interface-active compounds are, in particular, anionic and nonionic surfactants, such as ethoxylates of long-chain alcohols, ethoxylated mono-, di- and trialkylphenols, alkali metal and ammonium salts of $C_{12}$-$C_{18}$ alkylsulfonic acids or arylsulfonic acids.

For carrying out the polymerisation according to the invention, the organic phase, also known as the oil phase, is suspended in the aqueous phase. After initiation and performance of the polymerisation, the polymer can typically be filtered off or removed from the reaction mixture in another manner. Residues of solvents or other additives can be removed by washing with suitable solvents or, for example, steam distillation.

In an embodiment, the oil phase comprises inert solvents (porogens) in order to set the desired pore sizes, in addition to the monomers.

Suitable organic solvents (porogens) are, for example, aliphatic hydrocarbons ($C_6$-$C_{18}$), such as, for example, hexane, dodecane or benzine mixtures, cycloaliphatic compounds, such as cyclohexane, aromatic hydrocarbons, such as toluene, ethylbenzenes or xylenes, or alcohols, such as aliphatic $C_4$-$C_{12}$-alcohols, for example heptanol, dodecanol, cyclohexanol, polyethylene glycols or polypropylene glycols of various molecular weight, or esters of aliphatic carboxylic acids, such as butyl acetate or propyl propionate, or esters of aromatic carboxylic acids, such as propyl benzoate, or esters, such as butyl glycol acetate or glycerol triacetate, or ethers, such as di-n-butyl ether, di-n-amyl ether, diphenyl ether, ethylene glycol monophenyl ether and ethylene glycol diethyl ether.

These solvents can be employed individually or as a mixture of two or more solvents. They can either act as swelling agent or precipitant for the polymers and in this way influence the porosity.

Examples of swelling agents for the polymers according to the invention are lower alcohols, aliphatic esters or aromatic hydrocarbons, such as toluene. Examples of precipitants are aliphatic hydrocarbons, such as dodecane or benzine mixtures. The porosity of the polymers can be fixed through the type and amount of the solvents in combination with the degree of cross-linking of the polymer.

Furthermore, one or more initiators acting as free radicals are typically added to the organic phase.

Examples of free-radical initiators are organic peroxides, such as di-tertbutyl peroxide, dibenzoyl peroxide, bis(o-methylbenzoyl) peroxide, tert-butyl hydroperoxide, cumene hydroperoxide, diisopropyl peroxide dicarbonate, cyclohexanone peroxide, or aliphatic azo compounds, such as α,α'-azobis-isobutyronitrile, azobiscyanovaleric acid, 1,1'-azocyclohexane-1,1'-dicarbonitrile or azodicarboxamide. Preference is given to α,α'-azobisisobutyronitrile.

Initiators which can be activated by means of radiation, for example UV radiation, can also be employed in accordance with the invention as free-radical initiators.

The phase ratios in the suspension polymerisation can typically be varied in the volume ratio between 1:20 (oil phase to aqueous phase) and 2:1, ratios between 1:5 and 1:1, particularly preferably between 1:3 and 1:1, are preferred.

The ratio of organic solvent to monomer is typically between 1:20 and 4:1, preferably between 1:5 and 3:1, particularly preferably between 1:1 and 2.5:1.

The concentration of the initiator, based on the amount of monomer, is typically between 0.01% (by weight) and 10% (by weight), preferably between 0.1 and 7% (by weight) and particularly preferably between 0.2 and 7% (by weight).

The concentration of stabilisers, based on the amount of suspension medium, generally water, is between 0.01 and 7% (by weight), typically between 0.02 and 5% (by weight), particularly preferably between 0.05 and 2.5% (by weight).

The suspension polymerisation is then carried out by mixing the two phases with vigorous stirring. In addition, the temperature of the mixture is typically kept at 20 to 100° C., preferably 40 to 100° C., for a period of 1 to 20 hours. The mixture is typically heated at 40 to 100° C. over a period of 0.5 to 5 hours and subsequently post-polymerised again for several hours at 70 to 100° C. The mixture should be stirred throughout the time. These temperature data relate to a system in which water is used as suspension medium. On use of other polar solvents instead of water, other temperature ranges may be possible or appropriate, depending on the boiling point of the solvent.

It is generally advantageous to carry out the polymerisation according to the invention in a protective-gas atmosphere.

Finally, the mixture is generally cooled to room temperature, the organic solvents are removed, if they were added during the polymerisation, and the product is stored in water, an aqueous buffer or a mixture of water with an organic solvent, such as ethanol.

If necessary, the polymer can be brought to the desired particle-size distribution by sieving or another type of classification.

If an inverse suspension polymerisation or an emulsion polymerisation is to be carried out instead of the normal-phase suspension polymerisation, it is known to the person skilled in the art how to modify the composition of the reaction solutions.

The polymerisation according to the invention can likewise be carried out continuously. The particle production here is particularly preferably carried out using static mixers, in particular micromixers or caterpillar mixers. In these mixers, the spatial distribution of two components to be mixed is influenced, with utilisation of the flow energy, by the flow management, for example by separation and recombination, twisting, distortion and expansion, so that large interfaces are formed for diffusive exchange between the components and a particularly uniform particle-size distribution can be achieved due to the high shear forces. Different mixers and their structure are known. For example, systems of this type are described in EP 1177243.

In order to carry out the reactions, the aqueous phase flows, for example, continuously with a defined volume flow through the micromixer. The oil phase is subsequently fed in via the second inlet, likewise with a defined, precisely set volume flow. The ratio of the two volume flows can be in a broad range and depends on the desired particle size, the nature and distribution of the particle sizes, the viscosity of the aqueous and the oil phase, depending on the reaction temperature, and the reaction kinetics and the requisite ratio of the porogens in the end mixture in order to achieve a suitable pore structure. The volume flow ratio between the aqueous phase and the oil phase is preferably 1:10 to 100:1, in particular 2:1 to 20:1. The suspension exiting from the static mixer is preferably polymerised in a continuously operating reactor.

It is likewise possible to reverse the procedure described above. For example, for the polymerisation of particularly hydrophilic monomers, the latter are supplied via the aqueous phase. Further details on the synthesis of bead polymers with the aid of micromixers are given in EP 1177243.

It is furthermore known to the person skilled in the art how the particle size of the resultant polymer can be influenced, inter alia through the nature and amount of the addition of suspension stabilisers and interface-active compounds and the stirring intensity. In general, particle diameters between 3 μm and 500 μm, preferably between 3 μm and 300 μm, can be produced by means of suspension polymerisation, depending on the type of stirrer and the rotational speed. The particles can have an irregular shape or can preferably be spherical.

If the polymers according to the invention are prepared by means of emulsion polymerisation, particle diameters, for example, between 20 nm and 3000 nm, preferably between 100 and 500 nm, can be produced.

The polymers according to the invention can furthermore be prepared or exist in the form of membranes, fibres, hollow fibres, a coating or as a monolithic moulding. Monolithic mouldings are three-dimensional bodies, for example in cylindrical form.

The polymers according to the invention can equally be employed as composite materials, i.e., for example, as a coating, for example of inorganic particles, or a moulding, or mixed with, for example, inorganic constituents. An example thereof are particles of the polymer according to the invention which can themselves be magnetised by copolymerisation of magnetisable particles or of a magnetisable core.

The polymers according to the invention are preferably in the form of nonporous or particularly preferably porous particles. Depending on the type and amount of the porogenic solvent employed, the pore sizes can typically be between 2 and 300 nm. In accordance with the invention, pore size denotes pore radius. Preference is given to pore sizes or pore radii between 2 and 200 nm. In particular, if the polymers according to the invention are in the form of monolithic mouldings, they can also have pore sizes up to 1000 nm.

The pore distribution in the materials according to the invention can be monomodal, bimodal or oligomodal, preferably monomodal or bimodal.

The pore sizes are preferably measured by means of size exclusion chromatography (SEC). A measurement example in this respect is given in Example 3 and FIG. 2.

The hydrophilic, crosslinked polymers according to the invention are particularly suitable as sorbents in chromatography, as support materials for the immobilisation of biologically and/or catalytically active substances or as support materials for solid-phase syntheses of, for example, biopolymers, such as nucleic acids or peptides, or for combinatorial chemistry.

The materials according to the invention are distinguished by good stability to hydrolysis, in particular in basic medium, and by good pressure/flow stability. Furthermore, their high hydrophilicity makes them particularly suitable for biochromatographic methods. The examples contain additional experimental data on these properties.

The polymers according to the invention are particularly suitable as sorbents. For this purpose, they are introduced in a known manner into chromatography columns or capillaries. The polymer according to the invention can equally be packed in cartridges for chromatographic or other purposes. The present invention therefore also relates to chromatography columns, capillaries or cartridges which contain a polymer according to the invention as sorbent or support material.

The polymers according to the invention can be employed in their native form, i.e. without further derivatisation steps, for example, depending on the porosity set, for size exclusion chromatography (SEC) or for reduction of the salt content of solutions if these solutions contain target molecules whose molecular weight differs significantly from the molecular weight of the salt, or provided with other or additional functionalities by one or more derivatisation steps. In particular, they can be derivatised by means of separation effectors. These separation effectors may be either ionic or neutral or have a preferred affinity or selectivity for one or more target molecules.

The covalent bonding of the separation effectors generally takes place via the functional groups present on the polymer, such as, for example, hydroxyl groups, for example with formation of an ester or preferably an ether function, directly or via a linker or spacer. In another preferred embodiment, the linking to the base material takes place via graft polymerisation, such as, for example, a cerium(IV)-catalysed graft polymerisation with formation of a C—C link to the base material.

Separation effectors are known to the person skilled in the art in the area of chromatography. Separation effectors are substituents which can be introduced into the support material as early as during the synthesis of the base material or subsequently and influence the surface properties of the support material. In particular, targeted derivatisation of support materials by means of separation effectors produces support materials having certain chromatographic properties. In particular, separation effectors can have the following terminal groups:

a) an ionic or ionisable group, for example

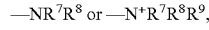

in which
R$^7$ and R$^8$, independently of one another,
  H, alkyl having 1-5 C atoms
and
R$^9$ alkyl having 1-5 C atoms
with the proviso that, if X=—N$^+$R$^7$R$^8$R$^9$, R$^7$ and R$^8$ cannot be H,
guanidinium
SO$_3^-$
carboxylic acids b) a hydrophobic group, for example —OR$^{10}$ or —NHR$^{10}$, where R$^{10}$ denote C$_1$-C$_{20}$-alkyl, C$_6$-C$_{25}$-aryl, C$_7$-C$_{25}$-alkylaryl or C$_7$-C$_{25}$-arylalkyl, and where these radicals may also have been derivatised by means of nitrile or C$_1$-C$_5$-alkoxy, and where, in addition, one or more non-adjacent CH$_2$ groups may have been replaced by NH or O or, in addition, one or more CH groups may have been replaced by N;

c) a metal chelate group;
d) a thiophilic radical;
e) a chiral radical.
f) biomolecules, such as proteins (for example antibodies, protein A), peptides, amino acids, nucleic acids, saccharides, biotin, etc.

g) organic radicals which have increased affinity or selectivity for certain tar-get molecules (for example mono- or bistriazine-based separation effectors in accordance with WO 9710887 and WO 04/052870).

Thiophilic radicals are disclosed, for example, in EP 0 165 912.

If it is intended firstly to provide the polymer with a universal linker, it can, for example for the introduction of epoxide groups, be reacted with glycidyl compounds, such as butanediol diglycidyl ether.

Furthermore, the polymer according to the invention can, as base material, be provided by graft polymerisation with tentacle-like structures, which can in turn carry the corresponding separation effectors or be functionalised by means of the latter. The grafting is preferably carried out in accordance with EP 0 337 144. The chain produced is linked to the base material via a monomer unit. To this end, the base material according to the invention is suspended in a solution of monomers, preferably in an aqueous solution. The grafting-on of the polymeric material is effected in the course of a conventional redox polymerisation with exclusion of oxygen. The polymerisation catalyst employed is cerium(IV) ions, since this catalyst forms free-radical sites on the surface of the base material, from which the graft polymerisation of the monomers is initiated.

The polymerisation is terminated by termination reactions involving the cerium salts. For this reason, the (average) chain length can be influenced by the concentration ratios of the base material, the initiator and the monomers. Furthermore, uniform monomers or also mixtures of different monomers can be employed; in the latter case, grafted copolymers are formed.

Suitable monomers for the preparation of the graft polymers are monomers conforming to formula V or VI.

$$CR^*R^{**}\!\!=\!\!CR^{11}\!\!-\!\!Y \quad \text{(formula V)}$$

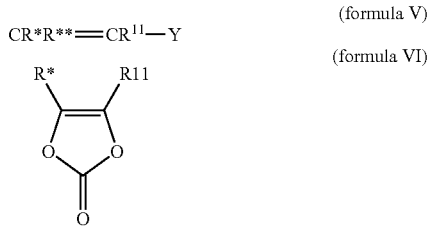

(formula VI)

These monomers are (meth) acrylic acid ($Y=\!\!-\!\!COOH$), (meth)acrylic acid derivatives where

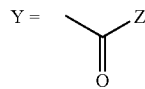

allylamines ($Y=\!\!-\!\!CH_2NH_2$, $-\!\!CH_2NR^{12}R^{13}$), (meth)acrylonitriles ($Y=\!\!-\!\!CN$), acroleins ($Y=\!\!-\!\!CHO$), vinylcarboxylates ($Y=\!\!-\!\!OCOCHR^{15}R^{16}$) or vinylene-carbonates of the formula VI.

All these monomers are polymerisable substances containing reversibly bonding groups which can be polymerised by means of free radicals in aqueous solution and which may be neutral, acidic or basic.

If the monomers employed are vinylenecarbonates of the formula VI or vinylcarboxylates $CR^*R^{**}\!\!=\!\!CR^{11}\!\!-\!\!OCOCHR^{15}R^{16}$ of the formula V, the product obtained is preferably subsequently converted into a separating material containing hydroxyl groups. This conversion into a hydroxyl phase is achieved by a mild alkaline or acidic saponification known per se. For example, the reaction can be carried out using methanolic $K_2CO_3$ solution at room temperature, described, for example, by Y. Tezuka et al., in Macromol. Chem. 186, 685-694 (1985).

In the formulae V and VI, $R^{11}$ preferably denotes H, i.e. the acrylic acid derivatives are preferred.

Y in formula V preferably denotes

$-\!\!COCHR^{15}R^{16}$ or $-\!\!CH_2NH_2$, secondarily preferably $-\!\!CN$ or $-\!\!CHO$.

$R^{15}$ and $R^{16}$, independently of one another, denote H or an alkyl group having up to 5 C atoms. At least one of the radicals $R^{15}$ and $R^{16}$ is preferably H. The following radicals are particularly preferred: acetoxy, propionyloxy, butyryloxy, valeryloxy and hexanoyloxy radical.

Z in formula V denotes $-\!\!OR^{14}$, $-\!\!OH$ or $-\!\!NR^{12}R^{13}$, preferably $-\!\!NR^{12}R^{13}$.

Preference is given here to compounds in which Z denotes $-\!\!NR^{12}R^{13}$ and one of the radicals $R^{12}$ and $R^{13}$ is H.

The radicals $R^{12}$ and/or $R^{13}$ preferably denote an alkyl, phenyl, phenylalkyl or alkylphenyl group, where the alkyl and/or phenyl group may be mono- or polysubstituted, preferably mono- or disubstituted, particularly preferably monosubstituted, by an alkoxy, cyano, amino, mono- or dialkylamino, trialkylammonium, carboxyl, sulfonyl, acetoxy or acetamino radical.

The radicals $R^{12}$ and/or $R^{13}$ preferably denote alkyl, alkoxyalkyl, cyanoalkyl, aminoalkyl, mono- or dialkylaminoalkyl, trialkylammoniumalkyl, carboxyalkyl or sulfonylalkyl having up to 10 C atoms, preferably up to 6 C atoms, particularly preferably up to 4 C atoms in the alkyl group, which may be linear or branched. $R^{12}$ and/or $R^{13}$ accordingly preferably denote methyl, ethyl, propyl, butyl, pentyl, hexyl, methoxymethyl, ethoxymethyl, 2-methoxyethyl, 2-, 3- or 4-oxapentyl, 2-, 3-, 4- or 5-oxahexyl, 2-, 3-, 4-, 5- or 6-oxaheptyl, isopropyl, 2-butyl, isobutyl, 2-methylbutyl, isopentyl, 2-methylpentyl, 3-methylpentyl, 2-oxa-3-methylbutyl, 3-oxa-4-methylbutyl, 2-methyl-3-oxapentyl, 2-methyl-3-oxahexyl, furthermore also heptyl, octyl, nonyl or decyl. Preference is furthermore also given to alkyl groups which are substituted by a cyano, carboxyl or sulfonyl group. Accordingly, $R^{12}$ and/or $R^{13}$ preferably denote cyanomethyl, cyanoethyl, cyanopropyl, cyanobutyl, cyanopentyl, cyanohexyl, 2-cyanopropyl, 2-cyanobutyl, carboxylmethyl, carboxylethyl, carboxylpropyl, carboxylisopropyl, carboxylbutyl, carboxylpentyl, carboxylhexyl, carboxyl-2-methylpropyl, carboxyl-2-methylbutyl, sulfonylmethyl, sulfonylethyl, sulfonylpropyl, sulfonylbutyl, sulfonylpentyl, sulfonylhexyl, sulfonyl-2-methylpropyl, sulfonyl-2-methylbutyl, sulfonyl-3-methylbutyl, sulfonyl-2-methylpentyl, sulfonyl-3-methylhexyl or sulfonyl-2-ethylpentyl. The alkyl groups are furthermore preferably monosubstituted by an amino, mono- or dialkylamino or trialkylammonium group. The alkyl groups here may be identical or different and have up to 10, preferably up to 6 C atoms, particularly preferably up to 4 C atoms, and accordingly preferably denote dimethylaminoethyl, diethylaminoethyl, methylaminoethyl, methylaminopropyl, dimethylaminopropyl, ethylaminoethyl, propylaminoethyl, propylaminopropyl, dipropylaminoethyl, dipropylaminobutyl, diethylaminoethyl, trimethylammoniumethyl, trimethylammoniumpropyl, trimethylammoniumbutyl, triethylammoniumethyl, triethylammoniumpropyl, triethylammoniumethyl, aminoethyl, aminopropyl, aminobutyl or aminopentyl. All these alkyl and substituted alkyl groups are likewise preferred as substituents on the phenyl group.

Preference is also given for $R^{12}$ and/or $R^{13}$ to a sulfone sulfide of the structure —$(CH_2)_n$—$SO_2$—$(CH_2)$—S—$(CH_2)_n$ OH where n=2, 3, 4, 5 or 6, preferably 2, 3 or 4.

$R^{12}$ and/or $R^{13}$ preferably also has the meaning of a phenyl group, which is preferably monosubstituted by cyano, cyanoalkyl, amino, aminoalkyl, mono- or dialkylamino, alkyl, alkoxy, alkoxyalkyl, mono- or dialkylaminoalkyl, trialkylammonium or trialkylammoniumalkyl, carboxyl, carboxyalkyl, sulfonyl or sulfonylalkyl. The preferred meanings of these substituents correspond to the preferred alkyl groups and substituted alkyl groups indicated above. The substituent on the phenyl group is preferably in the p-position. p-Acetoxyphenyl, p-aminophenyl or p-acetaminophenyl are likewise preferred meanings for $R^{12}$ and/or $R^{13}$.

Preference is furthermore given for $R^{12}$ and/or $R^{13}$ to an alkylphenyl or phenylalkyl group, where the preferred meanings indicated for the alkyl, substituted alkyl or substituted phenyl groups shall likewise apply.

Accordingly, the following substituted phenyl groups, for example, are regarded as particularly preferred: 4-cyanophenyl, 4-alkylphenyl, 4-(N,N-dimethylamino)phenyl, 4-(N,N-dialkylaminoethyl)phenyl, 4-ethoxyphenyl, 4-ethoxyethylphenyl, 4-trialkylammoniumphenyl, 4-carboxylphenyl, 4-sulfonylphenyl, phenylethyl, 4-(N-ethylamino) phenylpropyl or 4-cyanophenylethyl.

Furthermore, preferred monomers of the formula V are those in which $R^{12}$ and/or $R^{13}$ denote a cyclic or bicyclic radical, which may be aromatic or saturated, having 5-10 C atoms in which one or more CH or $CH_2$ groups have been replaced by N or NH, N or NH and S, or N or NH and O.

$R^{12}$ and/or $R^{13}$ accordingly preferably also denote a pyridine radical, imidazolyl radical, indolyl radical, furthermore preferably a pyrrole, pyrimidine, pyrazine, quinoline or isoquinoline radical.

$R^{12}$ and/or $R^{13}$ may also, for example, denote a thiazole, thiadiazole, morpholine, triazine, piperazine, benzothiazole, purine, pyrazole, triazole, pyrrolidine or isoxazole radical.

Particular preference is given here to the aromatic, heterocyclic radicals.

The radicals $R^{12}$ and $R^{13}$ must, in order to obtain suitable exchangers, be matched to one another in such a way that either both radicals contain an acidic or basic group or alternatively one of the radicals is neutral. The person skilled in the art is presented with no difficulty in assigning the groups correspondingly and thus assembling suitable radicals for $R^{12}$ and $R^{13}$, depending on the function and task of the desired ion exchanger.

One of the two radicals $R^{12}$ and $R^{13}$ is preferably a neutral radical.

$R^{14}$ preferably denotes alkyl, alkoxyalkyl, cyanoalkyl, carboxyalkyl or sulfonylalkyl having up to 10 C atoms, preferably having up to 6 C atoms, particularly preferably having up to 4 C atoms, in the alkyl group, which may be linear or branched. $R^{14}$ accordingly preferably denotes methyl, ethyl, propyl, butyl, pentyl, hexyl, methoxymethyl, ethoxymethyl, 2-methoxyethyl, 2-, 3- or 4-oxapentyl, isopropyl, 2-butyl, isobutyl, 2-methylbutyl, isopentyl, 2-methylpentyl, 3-methylpentyl, 2-oxa-3-methylbutyl, 3-oxa-4-methylbutyl, 2-methyl-3-oxapentyl or 2-methyl-3-oxahexyl.

Preference is furthermore also given to alkyl groups which are substituted by a cyano, carboxyl or sulfonyl group. Accordingly, $R^{14}$ preferably denotes cyanomethyl, cyanoethyl, cyanopropyl, cyanobutyl, cyanopentyl, cyanohexyl, 2-cyanopropyl, 2-cyanobutyl, carboxylmethyl, carboxylethyl, carboxylpropyl, carboxylisopropyl, carboxylbutyl, carboxylpentyl, carboxylhexyl, carboxyl-2-methylpropyl, carboxyl-2-methylbutyl, sulfonylmethyl, sulfonylethyl, sulfonylpropyl, sulfonylbutyl, sulfonylpentyl, sulfonylhexyl, sulfonyl-2-methylpropyl, sulfonyl-2-methylbutyl, sulfonyl-3-methylbutyl, sulfonyl-2-methylpentyl, sulfonyl-3-methylhexyl or sulfonyl-2-ethylpentyl. All these alkyl and substituted alkyl groups are likewise preferred as substituents on the phenyl group.

$R^{14}$ preferably also has the meaning of a phenyl group, which is preferably monosubstituted by cyano, cyanoalkyl, alkyl, alkoxy, alkoxyalkyl, carboxyl, carboxyalkyl, sulfonyl or sulfonylalkyl. The preferred meanings of these substituents correspond to the preferred alkyl groups and substituted alkyl groups indicated above. The substituent on the phenyl group is preferably in the p-position.

R* and R** in the monomers of the formula V preferably denote H.

R* and $R^{11}$ in formula VI preferably denote H.

Chains having between 2 and 100, preferably 5 and 60, in particular between 10 and 30, monomer units are typically grafted onto the base material.

As already mentioned above, there are sorbents in which exclusively one type of separation effector is present in the base matrix ("single mode" sorbents), and copolymers or "mixed mode" sorbents in which at least two different types of separation effectors are present in the sorbent. "Single mode" sorbents separate the dissolved substances (solutes) on the basis of one type of interaction between separation effector and solutes. On use of mixed mode sorbents, the separation of the dissolved substances (solutes) is based on different types of interactions between separation effector and solutes. Chromatographic methods of this type are known as mixed mode chromatography.

In the simplest case, for example, the hydrophobicity of the base matrix is utilised in order to provide a sorbent which is suitable for mixed mode chromatography by introduction of an ionic separation effector. Mixed mode sorbents are also accessible by reaction of a base matrix with two different reactants, one of which introduces, for example, a hydrophobic group, the other an ionic group into the base matrix. The disadvantage of the two procedures consists in that the steric relationship between the different types of separation effectors are not defined.

This disadvantage is avoided in the case of mixed mode sorbents in which the different separation effectors are combined in a ligand. This ligand is bonded to the base matrix.

Both types of mixed mode sorbents mentioned above are described in a review article by L. W. McLaughlin (1989) in Chem. Rev. 89, 309-319. A mixed mode sorbent whose different separation effectors are bonded in a single ligand can be prepared, for example, from a chloropropyl-substituted support material by conversion of the chlorine derivatives into bromine derivatives followed by reaction with benzyldimethylamine: the ligand is bonded to the base matrix via a C3 chain. This is followed by a dimethyl-substituted ammonium group, to which a lipophilic benzyl radical is bonded. A reverse arrangement of hydrophobic and ionic separation effectors in a ligand is obtainable by reaction of aminopropyl-substituted support material with p-diethylaminobenzoic acid: in this ligand, the tertiary amino group is oriented distally of the base matrix, while in the former variant, the hydrophobic benzyl group is arranged distally.

Further embodiments of such ligands having two separation effectors are disclosed in the following documents: WO 96/09116, WO 97/29825, WO 00/69872 and WO01/38228. The patent application EP 04028798.9 discloses more complex ligands having more than one separation effector each, and anion exchange groups whose nitrogen is in the form of an aza derivative of polycyclic structures, for example the quininuclidine system. Examples thereof are:

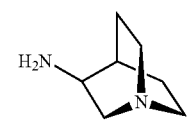
(a)

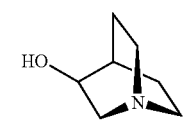
(b)

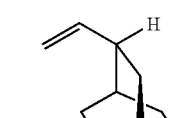
(c)

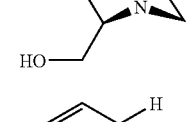
(d)

(e)

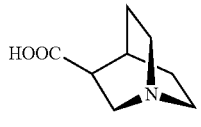
(f)

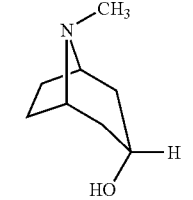
(g)

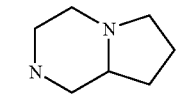
(h)

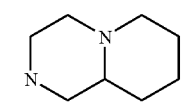
(i)

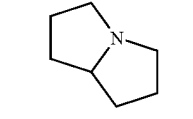
(j)

-continued

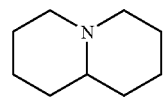
(k)

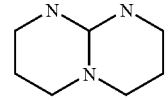
(l)

(m)

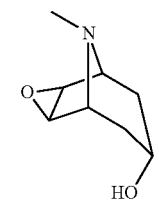
(n)

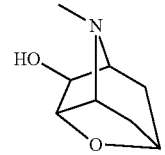
(o)

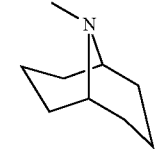
(p)

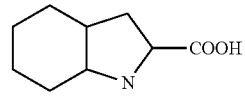
(q)

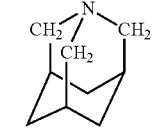
(r)

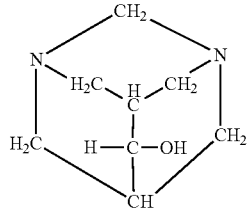
(s)

The possible applications of native polymers or polymers according to the invention provided with separation effectors may include, for example, selective, partially selective or nonselective binding or adsorption of one or more target components with the aim of removal from a matrix selective, partially selective or nonselective binding or adsorption of one or more secondary components with the aim of removal of the secondary component from a matrix separation of a substance mixture without binding or adsorption of one or more components merely on the basis of the molecular size by size exclusion chromatography isolation, enrichment and/or depletion of biopolymers from natural sources isolation, enrichment and/or depletion of biopolymers from recombinant sources isolation, enrichment and/or depletion of biopolymers from immortalised cell lines and culture supernatants thereof or from plants, in particular transgenic plants isolation, enrichment and/or depletion of biopolymers from B-cell lines and derivatives thereof, lymph cells and hybridoma cell lines and culture supernatants thereof isolation, enrichment and/or depletion of proteins and peptides isolation, enrichment and/or depletion of enzymes isolation, enrichment and/or depletion of monoclonal and polyclonal antibodies and naturally occurring or recombinant antibody fragments isolation, enrichment and/or depletion of phosphorylated peptides/proteins and nucleic acids isolation, enrichment and/or depletion of food additives isolation, enrichment and/or depletion of mono- and polysaccharides isolation, enrichment and/or depletion of glycosylated proteins isolation, enrichment and/or depletion of single-stranded or double-stranded DNA isolation, enrichment and/or depletion of plasmid DNA isolation, enrichment and/or depletion of RNA isolation, enrichment and/or depletion of viruses isolation, enrichment and/or depletion of host cell proteins isolation, enrichment and/or depletion of oligo- and polynucleotides isolation, enrichment and/or depletion of liposomes isolation, enrichment and/or depletion of products from blood and milk isolation, enrichment and/or depletion of low-molecular-weight active pharmaceutical ingredients (APIs)

removal of an API from an API drug carrier (for example an API/liposome adduct or an API/nanoparticle adduct)

isolation, enrichment and/or depletion of enantiomers

Depending on the type of separation effectors, the use of the polymers according to the invention corresponds by way of example to affinity chromatography, ion exchange chromatography, hydrophobic interaction chromatography, size exclusion chromatography, chiral chromatography or mixed mode chromatography or liquid-liquid partition chromatography The polymers according to the invention, in their native form or provided with separation effectors corresponding to the application, can be used in known chromatographic conceptional methods in which a sorbent is used. These methods can in principle be divided into discontinuous and continuous methods. Examples of discontinuous methods are mentioned in "Preparative Chromatography" (Ed. H. Schmidt-Traub, Wiley-VCH Verlag Weinheim, 2005, ISBN 3-527-30643-9, page 183-189). Further examples are flash chromatography, expanded bed chromatography, inter alia. Furthermore, the polymers according to the invention, in their native form or provided with separation effectors corresponding to the application, can be used in continuous methods, such as, for example, simulated moving bed chromatography. Further examples of continuous methods are described in "Preparative Chromatography" (Ed. H. Schmidt-Traub, Wiley-VCH Verlag Weinheim, 2005, ISBN 3-527-30643-9, page 190-204).

Both the continuous methods and also the discontinuous methods can be carried out, depending on the objective, either isocratically or also using the gradient technique. It is known to the person skilled in the art how the sorbent according to the invention, native or provided with separation effectors, is to be employed for the desired objective in one of the said methods.

The polymers according to the invention can also be used in thin-layer chromatography.

Even without further comments, it is assumed that a person skilled in the art will be able to utilise the above description in the broadest scope. The preferred embodiments and examples should therefore merely be regarded as descriptive disclosure which is absolutely not limiting in any way.

The complete disclosure content of all applications, patents and publications mentioned above and below, in particular the corresponding application EP 05 016 846.7, filed on Mar. 8, 2005, is incorporated into this application by way of reference.

EXAMPLES

1. Preparation of a Copolymer from Butanediol Monovinyl Ether and Divinylethyleneurea 1050 ml of deionised water (DI water) are charged into a double-walled reactor, and 0.32 g of tributyl phosphate, 4.2 g of sodium sulfate, 0.01 g of sodium laurylsulfonate and 2.1 g of polyvinyl alcohol as stabiliser are dissolved therein. The organic phase, consisting of 96.25 g of butanediol monovinyl ether, 78.45 g of divinylethyleneurea, 175 g of dodecanol and 4.2 g of $\alpha,\alpha'$-azobisisobutyronitrile, is added to the aqueous phase with stirring at room temperature after mixing and dissolution of the constituents. The suspension is stirred vigorously and subsequently warmed to 70° C. while flushing with nitrogen. After about 2 hours, the polymerisation is continued at 80° C. for 4 hours. After cooling to room temperature, the polymer is filtered off with suction, the porogen is removed by steam distillation, and the product is stored in 20% ethanolic solution.

130 g of polymer, based on the dry weight, are obtained. The average particle size is 80 μm.

Characterisation of the porous structure:
Specific surface area (BET): 322 $m^2$/g
The swollen volume of the reaction product is 4.3 ml/g.

2. Determination of the Retention Behaviour of Proteins (Nonspecific Binding)

The determination of the retention behaviour of proteins as a function of the salt concentration is employed to investigate the protein-binding behaviour of the unmodified support material. Since proteins only bind nonspecifically to the unmodified support material, it is advantageous if as little background binding as possible occurs.

The binding behaviour of the material according to the invention (prepared corresponding to Example 1) is depicted in comparison with the unmodified copolymer comprising 1,2,-dihydroxy-3-allylaxypropane and methylenebis-acrylamide, commercially available under the name FractoPrep® (Merck KGaA, Germany). FIG. 1 shows the binding behaviour of the proteins lysozyme and bovine serum albumin and of $NaNO_3$. The abbreviation FP stands for FractoPrep®, B/D stands for the copolymer according to the invention comprising butanediol monovinyl ether and divinylethyleneurea. The recovery of the measured proteins, quoted as the quotient of the photo-metrically determined amount of protein eluted from the column under the run conditions to the protein applied to the column, is greater than 90% under all experimental conditions.

3. Size Exclusion Chromatography on the Polymer According to the Invention

Figure 2:
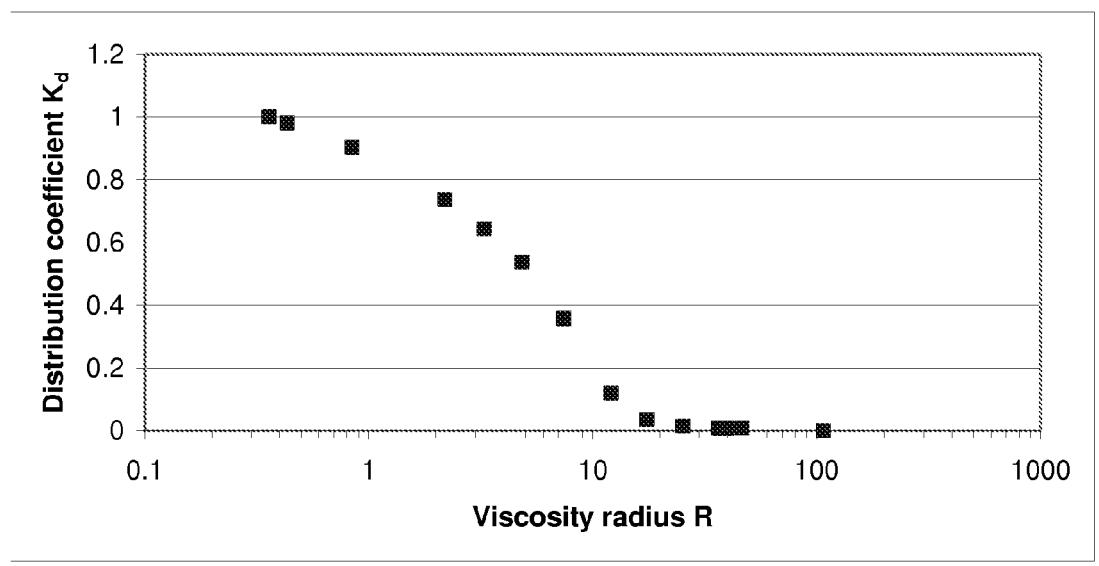
FIG. 2 shows the experimentally determined distribution coefficient Kd of dextrans having different molecular weights. Further details are given in Example 3.

An illustrative pore structure of the polymer according to the invention is shown by way of example in FIG. 2 through the experimentally determined distribution coefficient Kd of dextrans of various molecular weights, expressed by the viscosity radius of the dextrans.

4. Base Stability Investigations

The material according to the invention prepared corresponding to Example 1 is stored at room temperature in 0.5 M NaOH (volume ratio NaOH:polymer gel=4:1).

After certain times, the separation behaviour of the polymer is tested with reference to the retention behaviour in the separation of various pullulanes (PSS, Mainz, Germany) as marker compounds.
Eluent: 100 mM NaCl, 20 mM $NaH_2PO_4$, pH 7.2
Column: 300×10 mm, flow rate: 0.8 ml/min, refractive index detector.

Figure 3:
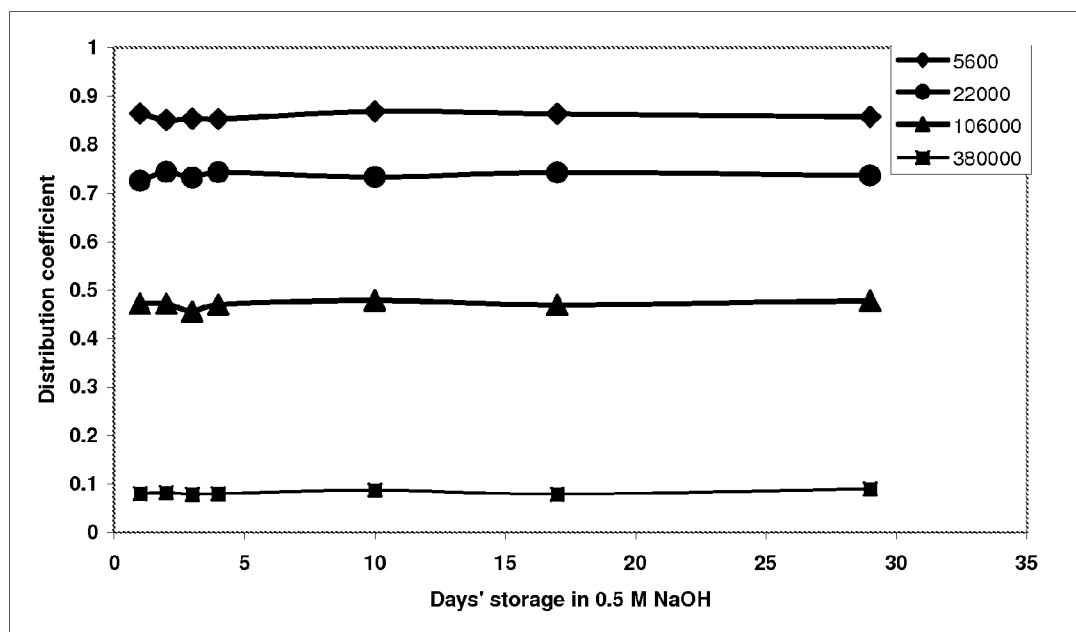
FIG. 3 shows the storage stability of a polymer according to the invention in dilute sodium hydroxide solution. Further details are given in Example 4.

FIG. 3 shows the results. It is clearly evident that storage in dilute sodium hydroxide solution has absolutely no effect on the distribution coefficient.

5.) Separation of a Protein Mixture

Figure 4:
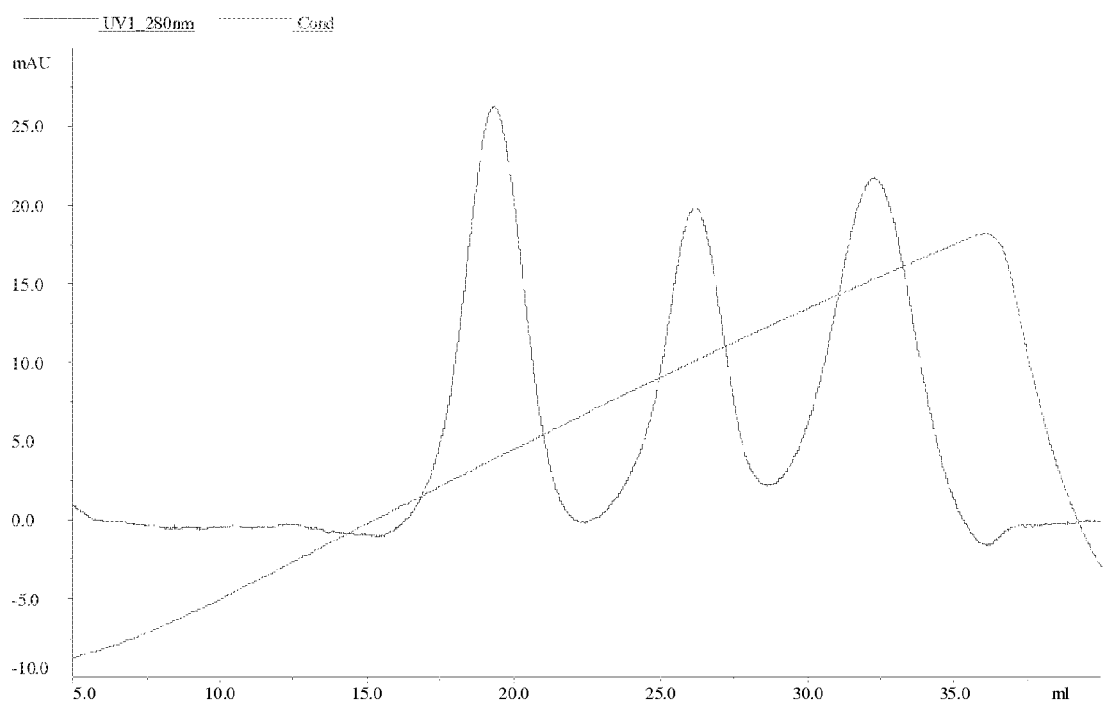
FIG. 4 shows the separation of a protein mixture on a polymer according to the invention provided with cationic separation effectors. Further details are given in Example 5.

The polymer according to the invention, consisting in this example of a copolymer of 65% by weight of butanediol monovinyl ether and 35% by weight of divinylethyleneurea in the form of spherical porous particles having an average particle diameter of 107 μm, is provided with cationic separation effectors by means of Ce(IV)-initiated graft polymerisation of 2-acrylamido-2-methyl-1-propanesulfonic acid corresponding to the procedure described on page 10 under Preparation Example A2 in WO 03/031062. The density of functional $SO_3$ groups in this polymer is obtained as 1195 μmol, based on 1 g of dry matter. The ion exchanger material prepared (BATCH: BDM SO3 DZ38) is introduced into a Superformance™ glass column, Goetec Labortechnik (depth of the sorbent bed 40 mm, diameter 10 mm) and equilibrated with a buffer consisting of 20 mM $NaH_2PO_4$, pH 6.0. 500 μl of a solution of 5 mg/ml of chymotrypsinogen A, 5 mg/ml of lysozyme and 5 mg/ml of cytochrome C in 20 mM $NaH_2PO_4$ are applied to the column. After the application, elution is carried out via a linear gradient over the course of 12 column volumes to 100% of a solution of 20 mM $NaH_2PO_4$, 1 M NaCl, pH 6.0. The elution behaviour of the polymer according to the invention results in separation of the individual proteins of the mixture. FIG. 4 shows the associated chromatogram.

6.) Pressure/Flow Behaviour

Figure 5:
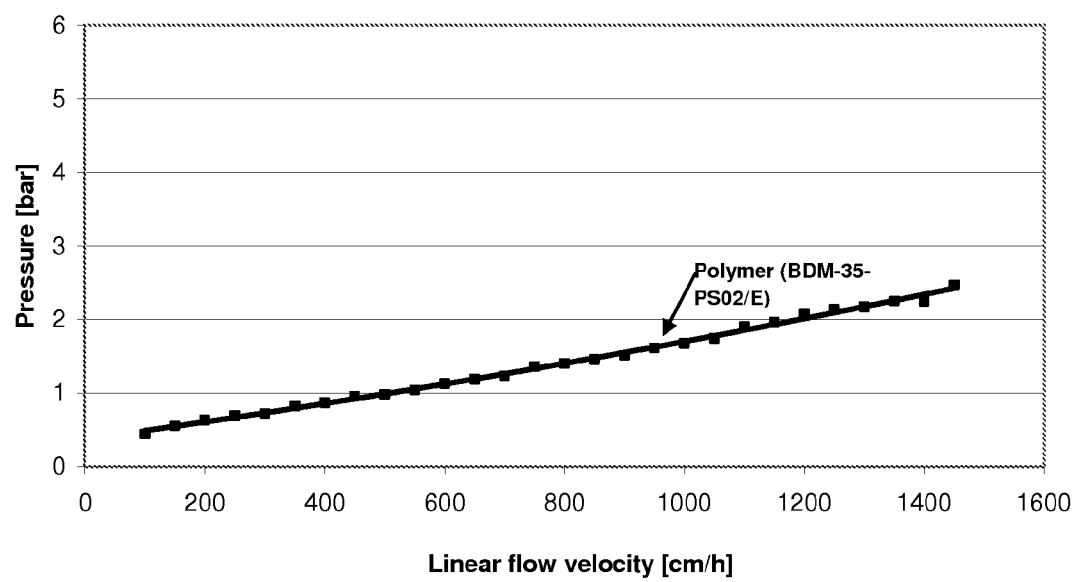
FIG. 5 shows the pressure/flow behaviour of the polymer according to the invention in a chromatography column.

The polymer according to the invention in its native form, consisting of 65% by weight of butanediol monovinyl ether and 35% by weight of divinylethyleneurea (BATCH: BDM PS02/E), is introduced into a Superformance™ glass column, Goetec Labortechnik, having a diameter of 50 mm. The depth of the sorbent bed is 20 cm. The average particle diameter of the spherical porous polymer is 107 μm. The pressure drop over this column is measured as a function of the flow rate of a solution of 100 mM NaCl, 20 mM $NaH_2PO_4$, pH 6.0. Even at a very high flow rate of 1400 cm/h, the pressure drop is less than 3 bar. FIG. 5 shows the associated graphical representation of the pressure/flow measurement.

The invention claimed is:
1. A polymer based on a copolymer at least comprising
a) at least one hydrophilically substituted alkyl vinyl ether of formula I

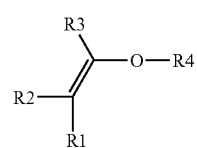

where
R1, R2, R3, independently of one another, is H or C1 to C6 alkyl, and
R4 is a radical which carries at least one hydroxyl group, and
b) at least one crosslinking agent of formula II and/or III and/or IV

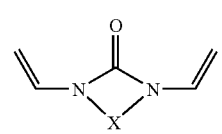

where
X is a divalent alkyl radical having 2 to 5 C atoms in which one or more methylene groups which are not adjacent and are not located in the direct vicinity of N may be replaced by O, C=O, S, S=O, $SO_2$, NH, NOH or N and one or more H atoms of the methylene groups may be substituted, independently of one another, by hydroxyl, C1-C6-alkyl, halogen, $NH_2$, C5-C10-aryl, NH—(C1-C8)-alkyl, N—(C1-C8)-alkyl$_2$, C1-C6-alkoxy or C1-C6-alkyl-OH,

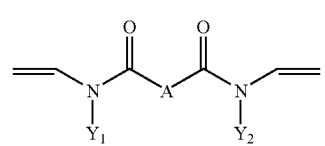

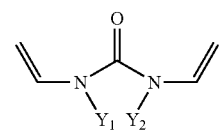

where
Y1 and Y2 in formula III and IV
are, independently of one another, C1 to C10 alkyl or cycloalkyl, where one or more non-adjacent methylene groups or methylene groups which are not located in the direct vicinity of N may be replaced by O, C=O, S, S=O, $SO_2$, NH, NOH or N and one or more H atoms of the methylene groups may be substituted, independently of one another, by hydroxyl, C1-C6-alkyl, halogen, NH$_2$, C5-C10-aryl, NH(C1-C8)alkyl, N(C1-C8)alkyl$_2$, C1-C6-alkoxy or C1-C6-alkyl-OH, or C6 to C18 aryl, where one or more H atoms in the aryl system may be substituted, independently of one another, by hydroxyl, C1-C6-alkyl, halogen, NH$_2$, NH(C1-C8)alkyl, N(C1-C8)alkyl$_2$, C1-C6-alkoxy or C1-C6-alkyl-OH, and A is a divalent alkyl radical having 2 to 5 C atoms in which one or more non-adjacent methylene groups or methylene groups which are not located in the direct vicinity of N may be replaced by O, C=O, S, S=O, SO$_2$, NH, NOH or N and one or more H of the methylene groups may be substituted, independently of one another, by hydroxyl groups, C1-C6-alkyl, halogen, NH$_2$, C5-C10-aryl, NH(C1-C8)alkyl, N(C1-C8)alkyl$_2$, C1-C6-alkoxy or C1-C6-alkyl-OH, which polymer has been derivatised by separation effectors, or has been derivatised by structures which have been attached to the polymer by graft polymerisation, or has been derivatised by structures which have been attached to the polymer by graft polymerisation with cerium(IV) catalysis.

2. A polymer according to claim 1, wherein R4 in formula I is a straight-chain or branched C1 to C10 alkyl radical, in which one or more non-adjacent methylene groups may be replaced by O, C=O, S, S=O, SO$_2$, NH, NOH, or N and/or in which one or more H atoms may be substituted, independently of one another, by C1-C6-alkyl, C5-C10-aryl, halogen, NH$_2$, NH(C1-C8)alkyl, N(C1-C8)alkyl$_2$, C1-C6-alkoxy or C1-C6-alkyl-OH and in which at least one OH group is present either on the C1 to C10 alkyl radical or on a substituent, or a cycloaliphatic radical, , in which one or more non-adjacent methylene groups may be replaced by O, C=O, S, S=O, SO$_2$, NH, NOH, or N and/or in which one or more H atoms of the cycloaliphatic radical may be substituted, independently of one another, by C1-C6-alkyl, C5-C10-aryl, halogen, NH$_2$, NH(C1-C8)alkyl, N(C1-C8)alkyl$_2$, C1-C6-alkoxy or C1-C6-alkyl-OH, where at least one OH group is present either on the cycloaliphatic ring or on a side chain or substituent, or a C6 to C18 aryl radical, where one or more H atoms in the aryl radical may be substituted, independently of one another, by hydroxyl, C1-C6-alkyl, C5-C10-aryl, halogen, NH$_2$, NH(C1-C8)alkyl, N(C1-C8)alkyl$_2$, C1-C6-alkoxy or C1-C6-alkyl-OH, where at least one OH group is present either on the aryl radical or on a side chain or substituent, or a C5 to C18 heteroaryl radical, where one or more H atoms in the heteroaryl radical may be substituted, independently of one another, by hydroxyl, C1-C6-alkyl, C5-C10-aryl, halogen, NH$_2$, NH(C1-C8)alkyl, N(C1-C8)-alkyl$_2$, C1-C6-alkoxy or C1-C6-alkyl-OH, where at least one OH group is present either on the heteroaryl radical or on a side chain or substituent.

3. A polymer according to claim 1, wherein the hydrophilically substituted alkyl vinyl ether is a compound of formula I in which R4 is a radical which carries a hydroxyl group.

4. A polymer according to claim 1, wherein the hydrophilically substituted alkyl vinyl ether is 1,2-ethanediol monovinyl ether, 1,3-propanediol monovinyl ether, 1,4-butanediol monovinyl ether, 1,5-pentanediol monovinyl ether, 1,6-hexanediol monovinyl ether, diethylene glycol monovinyl ether or cyclohexanedimethanol monovinyl ether.

5. A polymer according to claim 1, wherein the crosslinking agent is divinylethyleneurea (1,3-divinylimidazolin-2-one) or divinylpropyleneurea (1,3-divinyltetrahydropyrimidin-2-one).

6. A polymer according to claim 1, which is porous having pore sizes between 2 and 200 nm.

7. A polymer according to claim 1, which is in the form of particles having a diameter between 3 and 300 µm.

8. A polymer according to claim 1, which has been derivatised by separation effectors.

9. A polymer according to claim 1, which has been derivatised by structures which have been attached to the polymer by graft polymerisation.

10. A polymer according to claim 1, which has been derivatised by structures which have been attached to the polymer by graft polymerisation with cerium(IV) catalysis.

11. A polymer according to claim 9, wherein the structures are copolymers which have been produced from two or more different monomers.

12. A process for preparing a polymer, comprising copolymerizing, with addition of one or more porogens, at least one hydrophilically substituted alkyl vinyl ether of the formula I and at least one crosslinking agent of formula II and/or III and/or IV

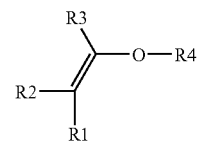

where

R1, R2, R3, independently of one another, are H or C1 to C6 alkyl, and

R4 is a radical which carries at least one hydroxyl group, and

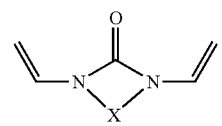

where

X is a divalent alkyl radical having 2 to 5 C atoms in which one or more methylene groups which are not adjacent and are not located in the direct vicinity of N may be replaced by O, C=O, S, S=O, SO$_2$, NH, NOH or N and one or more H atoms of the methylene groups may be substituted, independently of one another, by hydroxyl, C1-C6-alkyl, halogen, NH$_2$, C5-C10-aryl, NH—(C1-C8)-alkyl, N—(C1-C8)-alkyl$_2$, C1-C6-alkoxy or C1-C6-alkyl-OH,

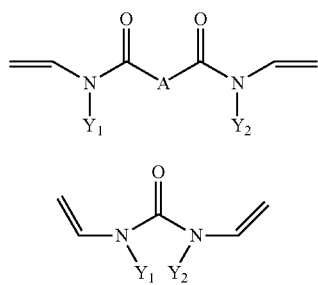

where
Y1 and Y2 in formula III and IV
are, independently of one another, C1 to C10 alkyl or cycloalkyl, where one or more non-adjacent methylene groups or methylene groups which are not located in the direct vicinity of N may be replaced by O, C=O, S, S=O, $SO_2$, NH, NOH or N and one or more H of the methylene groups may be substituted, independently of one another, by hydroxyl, C1-C6-alkyl, halogen, $NH_2$, C5-C10-aryl, NH(C1-C8)alkyl, N(C1-C8)alkyl$_2$, C1-C6-alkoxy or C1-C6-alkyl-OH, or C6 to C18 aryl, where one or more H in the aryl system may be substituted, independently of one another, by hydroxyl, C1-C6-alkyl, halogen, $NH_2$, NH(C1-C8)alkyl, N(C1-C8)alkyl$_2$, C1-C6-alkoxy or C1-C6-alkyl-OH, and A is a divalent alkyl radical having 2 to 5 C atoms in which one or more non-adjacent methylene groups or methylene groups which are not located in the direct vicinity of N may be replaced by O, C=O, S, S=O, $SO_2$, NH, NOH or N and one or more H of the methylene groups may be substituted, independently of one another, by hydroxyl, C1-C6-alkyl, halogen, $NH_2$, C5-C10-aryl, NH(C1-C8)alkyl, N(C1-C8)alkyl$_2$, C1-C6-alkoxy or C1-C6-alkyl-OH.

13. A process according to claim 12, wherein in the compound of formula I, R4 is a straight-chain or branched C1 to C10 alkyl radical, in which one or more non-adjacent methylene groups may be replaced by O, C=O, S, S=O, $SO_2$, NH, NOH, or N and/or in which one or more H atoms may be substituted, independently of one another, by C1-C6-alkyl, C5-C10-aryl, halogen, $NH_2$, NH(C1-C8)alkyl, N(C1-C8)alkyl$_2$, C1-C6-alkoxy or C1-C6-alkyl-OH and in which at least one OH group is present either on the C1 to C10 alkyl radical or on a substituent, or a cycloaliphatic radical, in which one or more non-adjacent methylene groups may be replaced by O, C=O, S, S=O, $SO_2$, NH, NOH, or N and/or in which one or more H atoms of the cycloaliphatic radical may be substituted, independently of one another, by C1-C6-alkyl, C5-C10-aryl, halogen, $NH_2$, NH(C1-C8)alkyl, N(C1-C8)alkyl$_2$, C1-C6-alkoxy or C1-C6-alkyl-OH, where at least one OH group is present either on the cycloaliphatic ring or on a side chain or substituent, or a C6 to C18 aryl radical, where one or more H atoms in the aryl radical may be substituted, independently of one another, by hydroxyl, C1-C6-alkyl, C5-C10-aryl, halogen, $NH_2$, NH(C1-C8)alkyl, N(C1-C8)alkyl$_2$, C1-C6-alkoxy or C1-C6-alkyl-OH, where at least one OH group is present either on the aryl radical or on a side chain or substituent, or a C5 to C18 heteroaryl radical, where one or more H atoms in the heteroaryl radical may be substituted, independently of one another, by hydroxyl, C1-C6-alkyl, C5-C10-aryl, halogen, $NH_2$, NH(C1-C8)alkyl, N(C1-C8)alkyl$_2$, C1-C6-alkoxy or C1-C6-alkyl-OH, where at least one OH group is present either on the heteroaryl radical or on a side chain or substituent.

14. A process according to claim 12, wherein a free-radical suspension polymerisation is carried out.

15. A process according to claim 12, wherein a free-radical suspension polymerisation is carried out in water as suspension medium in the presence of at least one suspension stabiliser and one or more optional further additives, inorganic salts or interface-active compounds.

16. A process according to claim 12, wherein the temperature during the polymerisation is between 40 and 100° C.

17. A process according to claim 12, wherein hydrophilically substituted alkyl vinyl ethers and crosslinking agents are in a weight ratio between 10:90 and 80:20.

18. A chromatography column, capillary or cartridge containing, as sorbent or support material, a polymer based on a copolymer at least comprising
a) at least one hydrophilically substituted alkyl vinyl ether of formula I

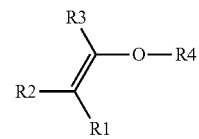

where
R1, R2, R3, independently of one another, is H or C1 to C6 alkyl, and
R4 is a radical which carries at least one hydroxyl group, and
b) at least one crosslinking agent of formula II and/or III and/or IV

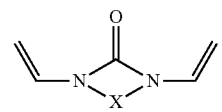

where
X is a divalent alkyl radical having 2 to 5 C atoms in which one or more methylene groups which are not adjacent and are not located in the direct vicinity of N may be replaced by O, C=O, S, S=O, $SO_2$, NH, NOH or N and one or more H atoms of the methylene groups may be substituted, independently of one another, by hydroxyl, C1-C6-alkyl, halogen, $NH_2$, C5-C10-aryl, NH—(C1-C8)-alkyl, N—(C1-C8)-alkyl$_2$, C1-C6-alkoxy or C1-C6-alkyl-OH,

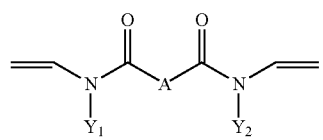

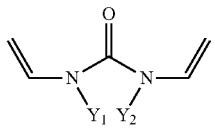

where
Y1 and Y2 in formula III and IV
are, independently of one another, C1 to C10 alkyl or cycloalkyl, where one or more non-adjacent methylene groups or methylene groups which are not located in the direct vicinity of N may be replaced by O, C=O, S, S=O, $SO_2$, NH, NOH or N and one or more H atoms of the methylene groups may be substituted, independently of one another, by hydroxyl, C1-C6-alkyl, halogen, $NH_2$, C5-C10-aryl, NH(C1-C8)alkyl, N(C1-C8)alkyl$_2$, C1-C6-alkoxy or C1-C6-alkyl-OH, or C6 to C18 aryl, where one or more H atoms in the aryl system may be substituted, independently of one another, by hydroxyl, C1-C6-alkyl, halogen, $NH_2$, NH(C1-C8)alkyl, N(C1-C8)alkyl$_2$, C1-C6-alkoxy or C1-C6-alkyl-OH, and A is a divalent alkyl radical having 2 to 5 C atoms in which one or more non-adjacent methylene groups or methylene groups which are not located in the direct vicinity of N may be replaced b O, C=O, S, S=O, $SO_2$, NH, NOH or N and one or more H of the methylene groups may be substituted, independently of one another, by hydroxyl groups, C1-C6-alkyl, halogen, $NH_2$, C5-C10-aryl, NH(C1-C8)alkyl, N(C1-C8)alkyl$_2$, C1-C6-alkoxy or C1-C6-alkyl-OH.

19. A method of providing a sorbent in chromatography, support material for the immobilisation of biologically or catalytically active substances or support material for a solid-phase synthesis, comprising providing as the sorbent or support material a polymer based on a copolymer at least comprising a) at least one hydrophilically substituted alkyl vinyl ether of formula I

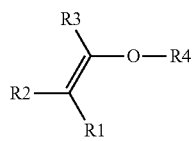

where
R1, R2, R3, independently of one another, is H or C1 to C6 alkyl, and
R4 is a radical which carries at least one hydroxyl group, and
b) at least one crosslinking agent of formula II and/or III and/or IV

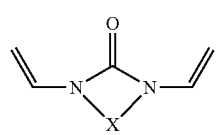

where
X is a divalent alkyl radical having 2 to 5 C atoms in which one or more methylene groups which are not adjacent and are not located in the direct vicinity of N may be replaced by O, C=O, S, S=O, $SO_2$, NH, NOH or N and one or more H atoms of the methylene groups may be substituted, independently of one another, by hydroxyl, C1-C6-alkyl, halogen, $NH_2$, C5-C10-aryl, NH—(C1-C8)-alkyl, N—(C1-C8)-alkyl$_2$, C1-C6-alkoxy or C1-C6-alkyl-OH,

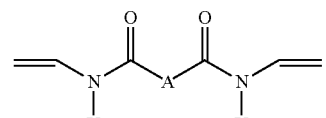

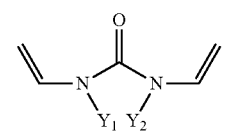

where
Y1 and Y2 in formula III and IV
are, independently of one another, C1 to C10 alkyl or cycloalkyl, where one or more non-adjacent methylene groups or methylene groups which are not located in the direct vicinity of N may be replaced by O, C=O, S, S=O, $SO_2$, NH, NOH or N and one or more H atoms of the methylene groups may be substituted, independently of one another, by hydroxyl, C1-C6-alkyl, halogen, $NH_2$, C5-C10-aryl, NH(C1-C8)alkyl, N(C1-C8)alkyl$_2$, C1-C6-alkoxy or C1-C6-alkyl-OH, or C6 to C18 aryl, where one or more H atoms in the aryl system may be substituted, independently of one another, by hydroxyl, C1-C6-alkyl, halogen, $NH_2$, NH(C1-C8)alkyl, N(C1-C8)alkyl$_2$, C1-C6-alkoxy or C1-C6-alkyl-OH, and A is a divalent alkyl radical having 2 to 5 C atoms in which one or more non-adjacent methylene groups or methylene groups which are not located in the direct vicinity of N may be replaced by O, C=O, S, S=O, $SO_2$, NH, NOH or N and one or more H of the methylene groups may be substituted, independently of one another, by hydroxyl groups, C1-C6)alkyl, halogen, $NH_2$, C5-C10-aryl, NH(C1-C8)alkyl, N(C1-C8)alkyl$_2$, C1-C6-alkoxy or C1-C6-alkyl-OH.

20. A chromatography column, capillary or cartridge according to claim 18, wherein R4 in formula I is
a straight-chain or branched C1 to C10 alkyl radical, in which one or more non-adjacent methylene groups may be replaced by O, C=O, S, S=O, $SO_2$, NH, NOH, or N and/or in which one or more H atoms may be substituted, independently of one another, by C1-C6-alkyl, C5-C10-aryl, halogen, $NH_2$, NH(C1-C8)alkyl, N(C1-C8)alkyl$_2$, C1-C6-alkoxy or C1-C6-alkyl-OH and in which at least one OH group is present either on the C1 to C10 alkyl radical or on a substituent, or a
cycloaliphatic radical, in which one or more non-adjacent methylene groups may be replaced by O, C=O, S, S=O, $SO_2$, NH, NOH, or N and/or in which one or more H atoms of the cycloaliphatic radical may be substituted, independently of one another, by C1-C6-alkyl, C5-C10-aryl, halogen, $NH_2$, NH(C1-C8)alkyl, N(C1-C8)alkyl$_2$, C1-C6-alkoxy or C1-C6-alkyl-OH, where at least one OH group is present either on the cycloaliphatic ring or on a side chain or substituent, or a C6 to C18 aryl radical, where one or more H atoms in the aryl radical may be substituted, independently of one another, by hydroxyl, C1-C6-alkyl, C5-C10-aryl, halogen, $NH_2$, NH(C1-C8)alkyl, N(C1-C8)alkyl$_2$, C1-C6-alkoxy or C1-C6-alkyl-OH, where at least one OH group is present either on the aryl radical or on a side chain or substituent, or a C5 to C18 heteroaryl radical, where one or more H atoms in the heteroaryl radical may be substituted, independently of one another, by hydroxyl, C1-C6-alkyl, C5-C10-aryl, halogen, $NH_2$, NH(C1-C8)alkyl, N(C1-C8)alkyl$_2$, C1-C6-alkoxy or C1-C6-alkyl-OH, where at least one OH group is present either on the heteroaryl radical or on a side chain or substituent.

21. A chromatography column, capillary or cartridge according to claim 18, wherein the hydrophilically substituted alkyl vinyl ether is a compound of formula I in which R4 is a radical which carries a hydroxyl group.

22. A chromatography column, capillary or cartridge according to claim 18, wherein the hydrophilically substituted alkyl vinyl ether is 1,2-ethanediol monovinyl ether, 1,3-propanediol monovinyl ether, 1,4-butanediol monovinyl ether, 1,5-pentanediol monovinyl ether, 1,6-hexanediol monovinyl ether, diethylene glycol monovinyl ether or cyclohexanedimethanol monovinyl ether.

23. A chromatography column, capillary or cartridge according to claim 18, wherein the crosslinking agent is divinylethyleneurea (1,3-divinylimidazolin-2-one) or divinylpropyleneurea (1,3-divinyltetrahydropyrimidin-2-one).

24. A chromatography column, capillary or cartridge according to claim 18, wherein the polymer is porous having pore sizes between 2 and 200 nm.

25. A chromatography column, capillary or cartridge according to claim 18, wherein the polymer is in the form of particles having a diameter between 3 and 300 μm.

26. A chromatography column, capillary or cartridge according to claim 18, wherein the hydrophilically substituted alkyl vinyl ether is 1,2-ethanediol monovinyl ether, 1,3-propanediol monovinyl ether, 1,4-butanediol monovinyl ether, 1,5-pentanediol monovinyl ether, 1,6-hexanediol monovinyl ether, diethylene glycol monovinyl ether or cyclohexanedimethanol monovinyl ether, and the the crosslinking agent is divinylethyleneurea (1,3-divinylimidazolin-2-one) or divinylpropyleneurea (1,3-divinyltetrahydropyrimidin-2-one).

27. A polymer according to claim 1, wherein the hydrophilically substituted alkyl vinyl ether is 1,2-ethanediol monovinyl ether, 1,3-propanediol monovinyl ether, 1,4-butanediol monovinyl ether, 1,5-pentanediol monovinyl ether, 1,6-hexanediol monovinyl ether, diethylene glycol monovinyl ether or cyclohexanedimethanol monovinyl ether, and the the crosslinking agent is divinylethyleneurea (1,3-divinylimidazolin-2-one) or divinylpropyleneurea (1,3-divinyltetrahydropyrimidin-2-one).

28. A chromatography column, capillary or cartridge containing, as sorbent or support material, a polymer according to claim 1.

29. A method of providing a sorbent in chromatography, support material for the immobilisation of biologically or catalytically active substances or support material for a solid-phase synthesis, comprising providing as the sorbent or support material a polymer according to claim 1.

30. A polymer according to claim 1, wherein R4 in formula I is a straight-chain or branched C1 to C10 alkyl radical, in which one or more non-adjacent methylene groups may be replaced by O, C=O, S, S=O, $SO_2$, NH, NOH, or N and/or in which one or more H atoms may be substituted, independently of one another, by C1-C6-alkyl, C5-C10-aryl, halogen, $NH_2$, NH(C1-C8)alkyl, N(C1-C8)alkyl$_2$, C1-C6-alkoxy or C1-C6-alkyl-OH and in which at least one OH group is present either on the C1 to C10 alkyl radical or on a substituent, or a cycloaliphatic radical having 5 to 10 C atoms, in which one or more non-adjacent methylene groups may be replaced by O, C=O, S, S=O, $SO_2$, NH, NOH, or N and/or in which one or more H atoms of the cycloaliphatic radical may be substituted, independently of one another, by C1-C6-alkyl, C5-C10-aryl, halogen, $NH_2$, NH(C1-C8)alkyl, N(C1-C8)alkyl$_2$, C1-C6-alkoxy or C1-C6-alkyl-OH, where at least one OH group is present either on the cycloaliphatic ring or on a side chain or substituent, or a C6 to C18 aryl radical, where one or more H atoms in the aryl radical may be substituted, independently of one another, by hydroxyl, C1-C6-alkyl, C5-C10-aryl, halogen, $NH_2$, NH(C1-C8)alkyl, N(C1-C8)alkyl$_2$, C1-C6-alkoxy or C1-C6-alkyl-OH, where at least one OH group is present either on the aryl radical or on a side chain or substituent, or a C5 to C18 heteroaryl radical, where one or more H atoms in the heteroaryl radical may be substituted, independently of one another, by hydroxyl, C1-C6-alkyl, C5-C10-aryl, halogen, $NH_2$, NH(C1-C8)alkyl, N(C1-C8)alkyl$_2$, C1-C6-alkoxy or C1-C6-alkyl-OH, where at least one OH group is present either on the heteroaryl radical or on a side chain or substituent.

* * * * *